Nov. 26, 1963   W. HOLZER   3,112,379
APPARATUS FOR THE PRESELECTION OF PROGRAMMES IN
CONNECTION WITH FULLY AUTOMATIC
WASHING MACHINES
Filed July 18, 1960   5 Sheets-Sheet 1
FIG.1. FIG.2. 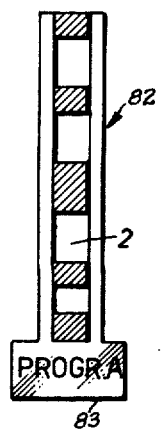 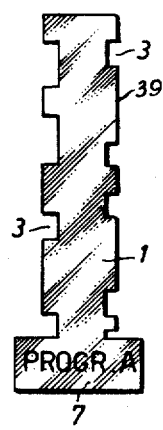 FIG. 4. 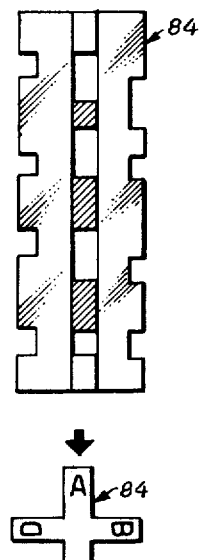

FIG.5.

INVENTOR:
WALTER HOLZER
By Toulmin & Toulmin
Attorneys

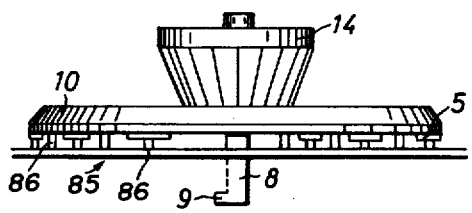
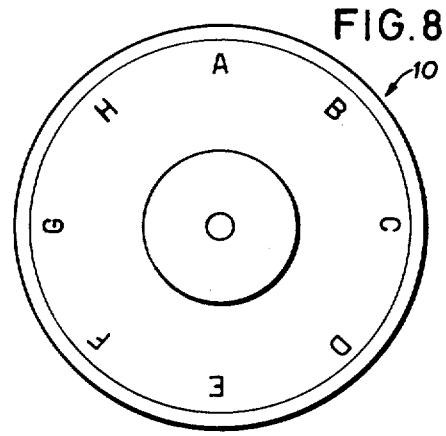
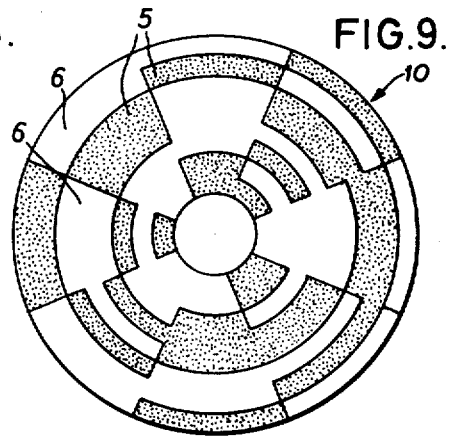
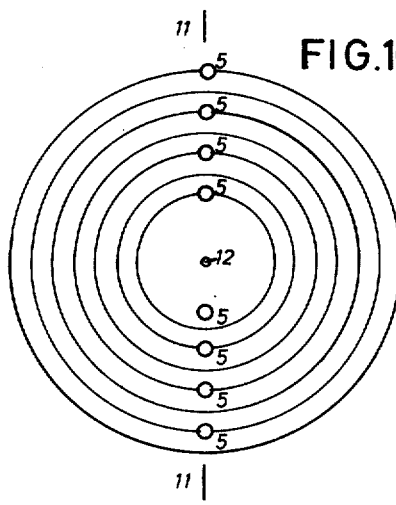
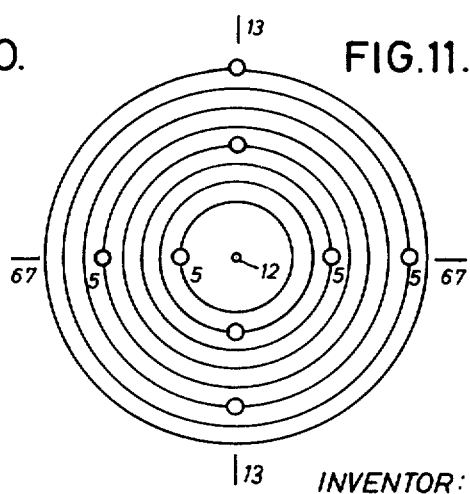
INVENTOR:
WALTER HOLZER

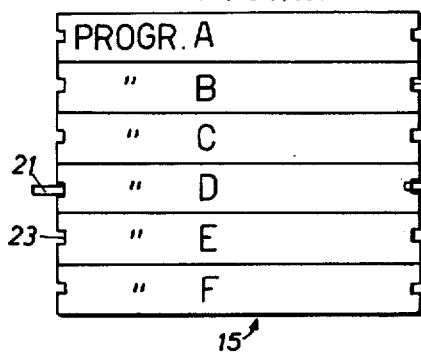
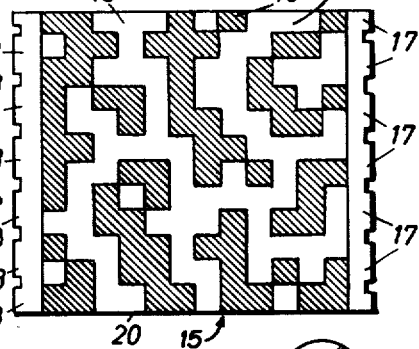
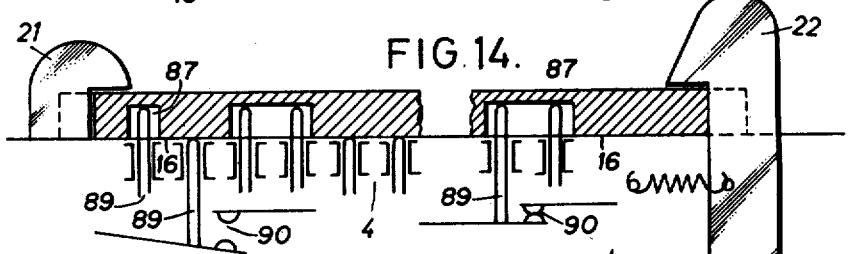
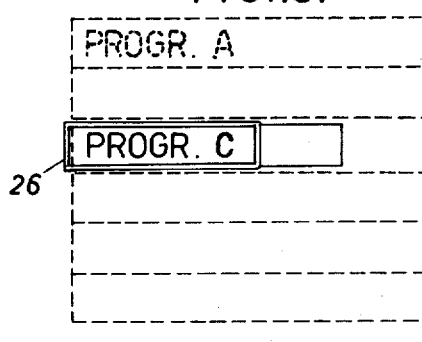

INVENTOR:
WALTER HOLZER

By Toulmin & Toulmin

Attorneys

Nov. 26, 1963  W. HOLZER  3,112,379
APPARATUS FOR THE PRESELECTION OF PROGRAMMES IN
CONNECTION WITH FULLY AUTOMATIC
WASHING MACHINES
Filed July 18, 1960  5 Sheets-Sheet 5
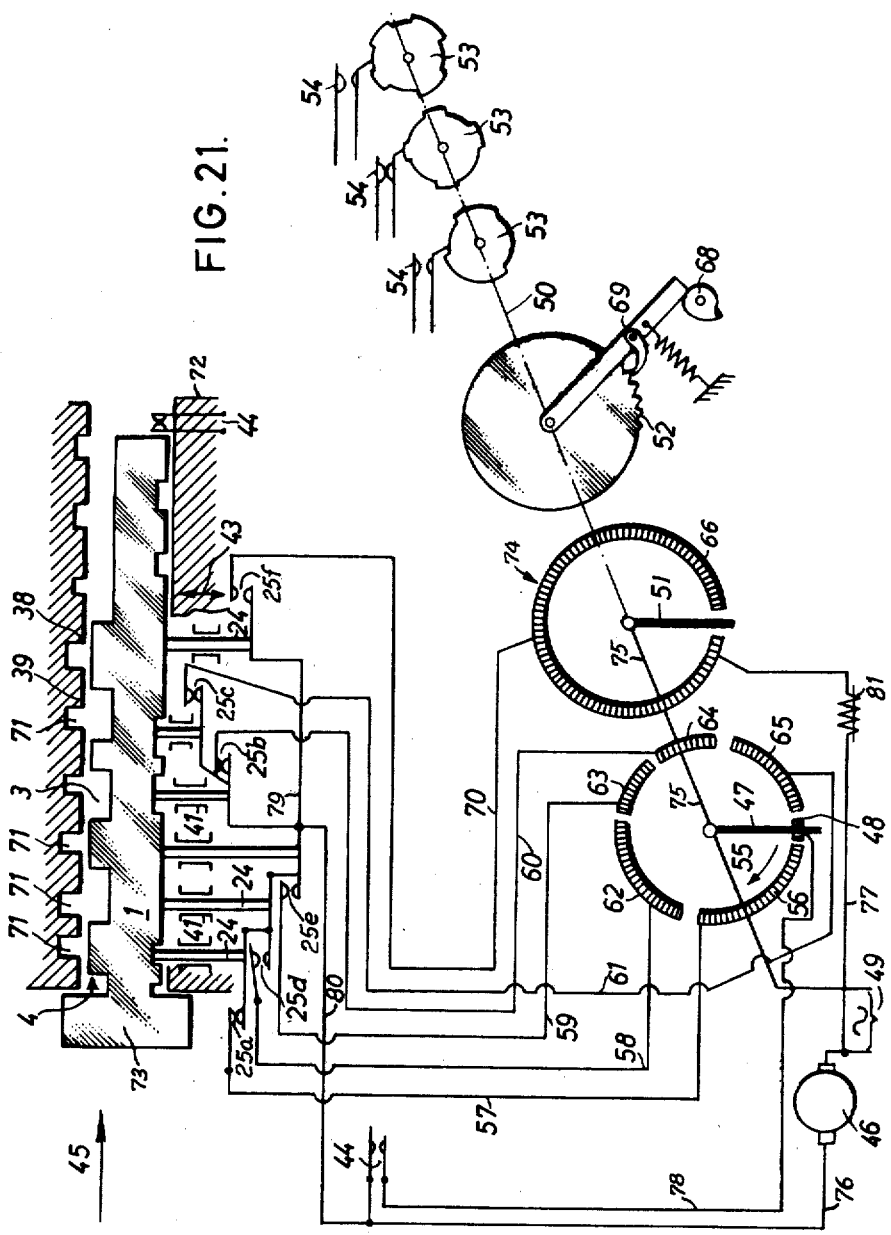
INVENTOR:
WALTER HOLZER
By Toulmin & Toulmin
Attorneys United States Patent Office 3,112,379
Patented Nov. 26, 1963

3,112,379
APPARATUS FOR THE PRESELECTION OF PROGRAMMES IN CONNECTION WITH FULLY AUTOMATIC WASHING MACHINES
Walter Holzer, Meersburg (Bodensee), Germany, assignor to Hoover Limited, Perivale, Greenford, Middlesex, England, a firm
Filed July 18, 1960, Ser. No. 43,459
Claims priority, application Switzerland July 23, 1959
8 Claims. (Cl. 200—46)

This invention relates to an apparatus for the preselection of washing programs in an automatic clothes or dishwashing machine.

It is an object of the present invention to provide an easily operated apparatus by which the various washing programs may be altered at will by unskilled persons without requiring structural changes in the apparatus, in which the apparatus remains stationary once a program is selected so that there is little wear to the apparatus and close tolerances are unnecessary. The apparatus is thus reliable in operation and inexpensive to manufacture.

Such an apparatus is disclosed in my copending application Serial No. 26,832, filed May 4, 1960. That apparatus operates satisfactorily but has certain drawbacks and the present invention is an improvement which eliminates those drawbacks.

According to the aforementioned application a key or plate having notches and projections along its edges is inserted into a key slot in the form of a switch box and by which switches are actuated or not depending upon whether the plate is provided with notches or projections at the switches. In order to change from one program to another the key or plate is removed from the slot and replaced in a different position.

Thus, according to the aforementioned application, it is necessary to remove the key entirely before a program can be changed with the result that the key may be lost or damaged or additional locking means must be provided.

According to the present invention the switch actuator or key may be inserted into the switch box, locked in position and moved to a plurality of positions while in locked position to select different programs.

According to one modification, the part or key to be inserted is guided into the slot in the direction of insertion and means is provided to lock it in position which means also permits movement of the key to provide for different programs successively while the key remains locked in position.

According to the invention a true key is provided operating in somewhat the same manner as a bayonet fitting such as by an inserting movement and a progressive rotating movement. Due to the progressive rotative movement the key is prevented from dropping out and becoming lost or making contact accidentally. Nevertheless, the key may be removed entirely and replaced by another having a different program setting.

According to one form of the invention the key is provided with a shaft and a handle in which the sides of the shaft are provided with notches and projections which engage switch actuating levers when the key is inserted into the key slot, the projections act as guides as the key is inserted and the handle is marked with the different programs, for example, by having indicia printed thereon.

The key may be made of metal or of a plastic material and the material of the key provided with scores so that pieces along the edge may be broken off to provide for different programs.

The key may be cruciform in cross-section and provided with notches and projections along each of its edges which engage switch actuators when the key is inserted into a correspondingly shaped keyhole and thus provide for four different programs.

The key may have any number of notched sides in the shape of a polygon or in an extreme case may be cylindrical in which case it would be necessary to provide a projection on the key to guide it into its slot and secure it against removal when it is rotated to set up the various programs.

According to another modification of the invention the program selector may be of disc shape provided on one face with elevations and depressions to engage the switch actuators and with a shaft for locking the disc in place and with indicia on its opposite face to indicate the program for which the selector is set. In this modification the switch actuators may be arranged in offset radii, either on a single diameter or on different diameters, for example at right angles to each other.

The program selector may also take the form of a flat plate formed on one face with humps and cut-outs for engagement with the program switch actuators and with indicia on its other face to indicate the particular program for which the selector is set.

The opposite edges of the plate may be formed with notches for receiving hooks to hold the selector plate in place against the program switching means.

The plate may be moved to its various program selecting positions by a rack and pinion arrangement in which the pinion is rotated by a setting wheel.

The plate, however, remains stationary during any program setting. The plate may be enclosed in a housing having a window to expose the indicia on its upper face and thus indicate the program for which the selector is set.

A pointer may be provided, movable along a scale to indicate the program setting of the plate and operated from a remote point by means of a cable, thus permitting the program selector to be positioned remotely from the indicator.

According to another modification of the invention, the program selector may be in the form of flexible bands or collars provided with switch actuators such as cams, holes or pins guided and moved to its various positions by a rotatable roller, the band or collar also being provided with program indicating indicia which is visible through a window in which the program selector is mounted.

The band or collar may be provided with numerous perforations for the temporary insertion of pins to select a desired program, the pins being easily inserted and removed by suitable bayonet connections. The bands or collars may be manufactured with preselected printed inscriptions, impressions, etc. or provided with printed circuits for direct contact with the program switches.

The invention will be further described, by way of example, with reference to the accompanying drawings in which:

FIG. 1 is a partial sectioned view of a program selector key according to the invention, the opposite sides of which are provided with humps and depressions, the humps on one side being shown shaded;

FIG. 2 is a side view of a modified form of a program selector key according to the invention provided with notches along each of its edges;

FIG. 4 is a side view, partly in section, of a modified form of a program selector key according to the invention, in which the key is cruciform in cross-section with notches formed along each of its four edges;

FIG. 5 is an end view of the key of FIG. 4 showing indicia on each of its legs to indicate the program of each leg;

Figure 18:
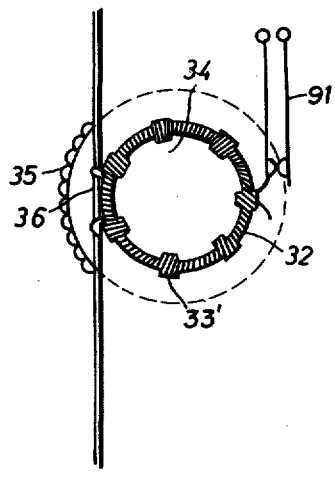
Figure 19:
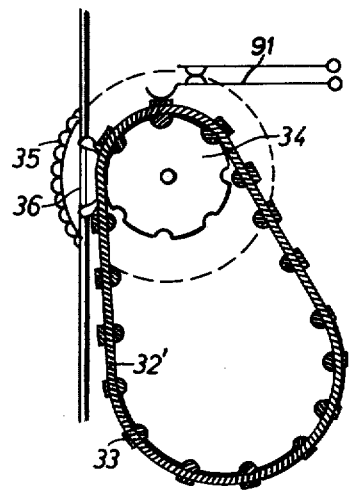
Figure 20:
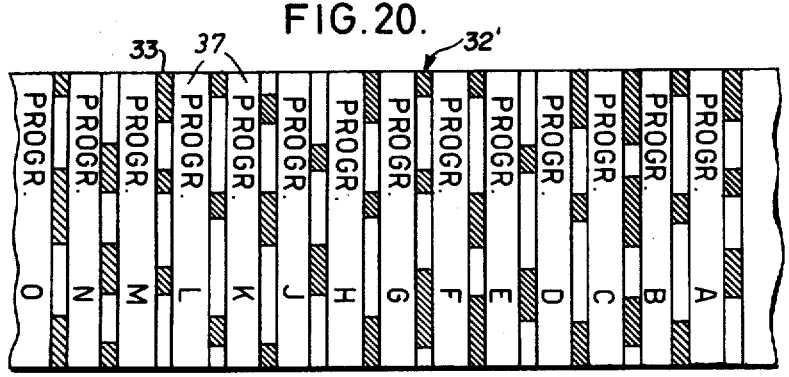

4 having an actuating knob with the program indicia marked thereon;

FIG. 7 is a side view of a modified form of a program selector according to the invention in which the selector is in the form of a disc;

FIG. 8 is a top view of the program selector of FIG. 7 showing the program indicia on one of its faces;

FIG. 9 is a bottom view of the program selector of FIG. 7;

FIG. 10 is a diagrammatic view showing one form of an arrangement for the cams on the program selector of FIG. 7;

FIG. 11 is a diagrammatic view of another arrangement of the cams on the program selector of FIG. 7;

FIG. 12 is a front view of a plate type program selector according to the invention with the program indicia thereon and showing the holding hooks in place;

FIG. 13 is a rear view of the program selector of FIG. 12 showing switch actuating humps and depressions with the humps hatched;

FIG. 14 is a sectional view of the program selector plate of FIG. 12 diagrammatically showing its relationship to the switch actuators of a typical program control switch mechanism;

FIG. 15 is a diagrammatical view of a housing for the program selector of FIG. 12 showing a program indicia visible through a window opening;

FIG. 16 is a fragmentary view of the actuator for the program selector of FIG. 12 taken at right angles to FIG. 15;

FIG. 17 shows an alternative arrangement of a program viewer for the program selector of FIG. 12;

FIG. 18 is a sectional view of a modified form of program selector according to the invention in the form of an endless flexible collar or band;

FIG. 19 is a sectional view of a modified form of an endless band program selector according to the invention;

FIG. 20 is a development of the endless band or collar type program selector of FIG. 19; and FIG. 21 is a diagrammatic showing of a program timing arrangement using the program key of FIG. 2.

Figure 3:
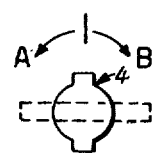
FIG. 3 is a diagrammatic view of a keyhole slot for the insertion of the key of FIG. 2 showing the key inserted in dotted lines.

The invention may best be understood by a first consideration of FIGS. 2, 3 and 21.

As shown in FIG. 2 the key 1 is flat and is provided with notches 3 in each of its edges which form protuberances 39 between the notches 3.

The relative positioning of the notches 3 and accordingly the protuberances 39 as shown in FIG. 2 is exemplary only and their spacing may be rearranged as desired to provide different washing programs.

As shown the key 1 is provided with a hand grip portion 73 upon which indicia 7 may be imprinted to indicate the type of program provided by the key. A similar indicia may be provided on the opposite face of the hand grip 73.

The keyhole or slot 4 of FIG. 3 is formed in the face of a switch box 72 (FIG. 21). The key 1 of FIG. 2 is inserted into the keyhole 4 and turned through 90° in one way or the other, which locks the key in position and brings the notches 3 and protuberances 39 into the proper relationship with program switch actuators as will be explained in connection with FIG. 21.

By rotating the key 1 in one direction, one washing program is set up and by rotating it in the opposite direction a different program is set up. Thus the key 1 of FIG. 2 provides for two separate and distinct washing programs.

By varying the spacing of the notches 3 and protuberances 39 and inserting the modified key into slot 4, any number of washing programs may be provided for.

When the key 1 is rotated in either direction to initiate a washing program it remains stationary until the program is completed. Thus there is little wear on the key and it need not be made with close tolerances.

The switch box 72 may be mounted in either a horizontal or vertical position. In FIG. 3 the hand grip 73 is shown by dotted lines and it is obvious that when the key 1 is rotated 90° in either direction, that the indicia 7 on one side or the other will be visible to indicate to the operator the particular program being carried out.

In FIG. 21 a modified version of the key 1 is shown positioned in the keyhole 4 of the switchbox 72.

Mounted within the switch box 72 are a plurality of normally closed switches 25a, 25b, etc. adapted to be actuated under certain conditions, by switch actuators in the form of plungers 24 guided for reciprocating movement by guides 41. In actual practice the plungers are of the same length but for purposes of clarity they have been shown as being of different lengths.

In FIG. 21 only a few of the plungers 24 have been shown. In order to increase the number of operations capable of being controlled the number of plungers 24 and switches may be increased. For example, the recesses 71 shown at the top of the keyhole 4 of the switch box 72 are for the purpose of diagrammatically indicating positions for mounting additional plungers 24.

Each of the contacts of the switches are connected by proper circuitry to the program control mechanism generally indicated by the reference numeral 74.

The mechanism 74 includes a rotatable shaft 50 having a plurality of switching discs or cams 53 mounted thereon adapted to close normally open switches 54 as the shaft 50 is rotated. The switches 54 may control, either directly or by contactors, the various elements of an automatic washing machine, such as, heaters, motors, valves, etc.

When a particular operation is to be timed the shaft 50 is rotated, in the direction of arrow 55, in a step by step manner by a ratchet wheel 52. The cam 68 is driven by a timer motor (not shown) which oscillates the arm upon which the ratchet detent 69 is mounted so as to rotate the ratchet wheel 52 step by step in an obvious manner.

The time duration of the timed operations may be varied by changing the speed of rotation of the cam 68.

In any particular washing program certain operations are not necessary in which case the program control 74 is set up to skip such operations. For that purpose the shaft 50 is adapted to be rotated at a comparatively high speed by a motor 46 which is connected to the shaft 50 to rotate the same by any suitable means (not shown), in which case the teeth of ratchet wheel 52 move past the ratchet detent 69 in an obvious manner.

Also mounted on the shaft 50 to rotate therewith are a pair of wiper arms 47 and 51 which are electrically connected to certain of the switches 25a etc. as will appear.

Arranged in a circular manner in the path of movement of the outer end of wiper arm 47 are a plurality of conducting segments which are electrically connected to certain of switches 25a etc. as will be explained.

Arranged in a circle about the outer end of wiper 51 is a conducting segment 66 which is electrically connected in circuit and which has an open space in its periphery as shown and which constitutes the off position of the program control 74.

In addition to the switches 25a etc. the switch box 72 is also provided with a starting switch 44, which, in order to simplify the wiring diagram, has been shown twice, firstly at the right hand end of switch box 72, to show its physical relationship to the key 1 and secondly at the left of the wiring diagram to show its electrical connections in the wiring diagram.

With the particular key 1 shown in FIG. 21, the upper ends of the first, fourth and fifth plungers 24 will enter notches 3 in the key 1 which will permit their corresponding switches 25a, 25b and 25c to close while the remainder of the plungers 24 are held downwardly by the engagement of their upper ends with projections 39 on the edge of key 1 to thus hold their corresponding switches 25d, 25e and 25f open.

The power source is shown at 49 and one of its sides is conductively connected to the wipers 47 and 51 by conductor 75 which may be associated with the shaft 50.

The other side of the power source 49 is connected through the motor 46 and conductor 76 to the movable contact of starting switch 44 and by conductor 77 to the segment 66. The fixed contact of starting switch 44 is connected to conducting segment 48 by conductor 78.

The movable contact of each of the switches 25a, 25b, etc. is connected to a bus bar 79 which is connected by conductor 80 to the movable contact of starting switch 44 and to one side of the power source 49 by conductor 76 and motor 46.

The fixed contacts of switches 25a, 25b and 25c are connected to conducting segments 56, 64 and 65 by conductors 57, 60 and 61 respectively. Reading from left to right the fixed contacts of the remaining switches 25d, 25e and 25f are connected to conducting segments 62, 63 and 66 by conductors 58, 59 and 70 respectively.

In operation, the key 1 is inserted into the keyhole slot 4 in the direction of the arrow 45 and then rotated in the direction of the arrow 42 shown at the right hand end of switch box 72. The key 1 is guided into the slot 4 by the coaction of the side 38 of the slot with the projections 39 of the key. Suitable stops (not shown in FIG. 12) are provided to limit the rotation of the key to a 90° arc as in FIG. 3.

As previously stated the switches are normally closed. Thus, the insertion of the key and its rotation will cause the projections 39 to depress all of the plungers 24 which are in their path while the plungers opposite the notches 3 will not be moved. In the arrangement shown, the switches 25a, 25b and 25c will remain closed while the remainder of the switches 25d, 25e and 25f will be opened.

The insertion of the key 1 as above described also momentarily closes the starting switch 44 and the motor 46 will be energized from one side of the power source 49, line 75, wiper 47, conducting segment 48, line 78, switch 44, line 76 and motor 46 back to the other side of the power source 49.

The shaft 50 will be rotated in the direction of the arrow 55 and move wiper 47 from conducting segment 48 onto conducting segment 56 and the wiper 51 onto conducting segment 66.

Since the switch 25a is closed the motor 46 will remain energized from one side of the power source 49, line 75, wiper 47, conducting segment 56, line 57, switch 25a, bus bar 79, conductors 80 and 76 and motor 46 back to the other side of power source 49.

Thus, the shaft 50 will be rotated to quickly move the wiper 47 across conducting segment 56 onto conducting segment 62 and any washing function normally controlled by cams 53 during that arc of rotation will be by-passed.

As the wiper 47 reaches the conducting segment 62, the motor 46 is open circuited at the switch 25d connected to conductor 58 and rotation of the motor 46 will cease.

The shaft 50 will then be rotated in a step by step manner by the cam 68 rotating the ratchet wheel 52 step by step until the wiper 47 moves off of conducting segment 62 onto conducting segment 63. Thus the washing operation controlled by cams 53 during that period will be timed.

As the wiper 47 reaches the conducting segment 63 the motor will remain open circuited by the open switch 25e at the end of conductor 59 and the shaft 50 will continue to be rotated step by step until the wiper 47 reaches the conducting segment 64. Thus, the washing operation controlled by segment 63 will also be timed.

When the wiper 47 reaches the conducting segment 64, the motor 46 will be re-energized from one side of power source 49, conductor 75, wiper 47, conducting segment 64, line 60, switch 25b, bus bar 79, conductors 80 and 76 and motor 46 to the other side of power source 49.

Thus the washing operations controlled by segment 64 will be by-passed as previously explained.

As the wiper 47 moves from segment 64 onto conducting segment 65 the motor 46 will remain energized from one side of the power source 49, conductor 75, wiper 47, segment 65, line 61, switch 25c, bus bar 79, conductors 80 and 76 and motor 46 to the other side of power source 49.

The wiper 47 will thus be moved quickly over segment 65 and the washing operation which otherwise would have been controlled by segment 65 is by-passed as previously described.

As the wiper moves from segment 65 to segment 48, which is the starting position, the motor 46 will be de-energized since the starting switch 44 is normally open.

In addition the wiper 51 will be moved from the segment 66 which is the zero or starting position where nothing is energized.

If it is desired to repeat the same program the key 1 is pushed inwardly momentarily to energize motor 46 and move wiper 47 from segment 48 to segment 56 and the same program will be repeated.

If during the operation of a washing program it is desired to terminate the program prior to its normal termination, the key 1 is rotated reversely to the arrow 42 or it may be removed entirely from the keyhole 4.

That will remove all of the projections 39 out of contact with the plungers 24 and all of the switches 25a etc. including switch 25f at the end of conductor 70 will close.

At all times during the operation of a washing program the wiper 51 is in contact with the conducting segment 66. Thus, when the switch 25f at the end of conductor 70 is closed the motor 46 will be energized from one side of the power source 49 by conductor 75, wiper 51, segment 66, conductor 70 and closed switch 25f, bus bar 79, conductors 80 and 76 and motor 46 to the other side of power source 49.

The motor 46 will rapidly rotate the shaft 50 in the direction of arrow 55 until the wiper 51 moves off of segment 66, to the position shown, which is the zero or starting position.

Thus, regardless of which segment the wiper 47 is in contact with when the key 1 is thus reversely rotated and/or removed from the keyhole 4, all of the remaining program operations will be by-passed as previously described.

During the above described by-passing operation it is desirable that some means be provided for preventing the key 1 from being returned to its operative position.

For that purpose an electromagnetically actuated plunger (not shown) may be provided.

During the operation of program cycles with key 1 in the position shown a plunger (not shown) is held against the key by an electromagnet 81 which is energized from one side of power source 49 by line 77, solenoid 81, segment 66, wiper 51 and line 75 to the other side of power source 49.

When the key 1 is removed from its operative position the plunger moves into the keyhole to prevent the return of the key 1 to its operative position until wiper 51 moves off to segment 66 to de-energize the solenoid 81 and the plunger is then retracted by gravity or otherwise.

The modification of FIG. 1 may be used with a program control device similar to that of FIG. 21. The key 82 is provided with a shaft 2 provided with humps and intermediate depressions, the humps being shown by the hatched portions. The opposite side of shaft 2 is also provided with humps and intermediate depressions of different spacings to provide for a second preselected washing program.

The hand grip 83 may be provided with indicia as shown indicating the particular program provided for on each face. Instead of the indicia shown, the grip 83 could be inscribed with indicia indicating the particular type of wash for which the key is designed, such as "delicate washing," "coloreds," "whites," "boiling wash," etc.

The key 82 may be inserted into a keyhole in a switchbox similar to that of FIG. 21 and moved to bring either of its faces into operative position and the particular spacing of the humps and depressions will determine the program to be carried out.

A program selector key of star or cruciform shape is shown at 84, FIGS. 4 and 5. Each wing of key 84 is provided with notches and protuberances in the same manner as in the key 1 of FIG. 2. The spacing of the notches and protuberances on each wing is different so that four different washing programs are provided for.

The key 84 may be inserted into a cruciform keyhole similar to that of FIG. 21 and the key rotated to any of four positions to preselect four different washing programs. Each wing is marked with indicia as shown in FIG. 5 to indicate the program for that wing.

By inserting the key 84 into the keyhole from the opposite end eight different washing programs are provided for. In that case the wings at the opposite end of key 84 would be marked with indicia different from that shown in FIG. 5 to indicate the added washing programs.

Figure 6:
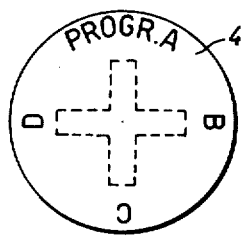
FIG. 6 is an end view of a key similar to that of FIG.

In the event that only four washing programs are desired the key 84 of FIG. 4 may be provided with a hand grip 40 (FIG. 6) in which case the indicia would be placed on the outer face of knob 40 as shown in FIG. 6.

The program selector 10 of FIGS. 7 through 11 is in the form of a disc which may be associated with a switch box, schematically indicated at 85. The lower face of disc 10 is provided with humps or cams 5 arranged in circles with depressions 6 between them as shown by FIG. 9.

The disc may be secured to the switch box 85 by a shaft 8 having a laterally extending projection 9 to lock it in position. The shaft 8 may rotate with the disc 10 or the disc 10 may rotate about the shaft.

The humps or cams 5 and the depressions 6 coact with switch actuators 86 to preselect various washing programs in a manner similar to that described in connection with FIG. 21. The disc 10 may be rotated by the knob 14.

The top face of disc 10 may be provided with indicia as shown by FIG. 8 to indicate the particular washing program which has been preselected, a reference point being provided on the switch box 85 for that purpose.

As shown by FIG. 10, the humps or cams 5 may be arranged on the diameter 11 of the disc 10 or, as shown by FIG. 11, they may be arranged on intersecting diameters 13 and 67.

In the modification of FIGS. 12 to 17 the program selector is in the form of a plate 15, which may be formed of a plastic material, paper pulp or metal.

As shown by FIG. 13 the under face of plate 15 is formed with elevations 16 shown hatched and depressions 87 arranged in parallel rows across the width of the plate on lines indicated by the reference numerals 17 and 18. Each two rows preselects a different washing program and there are twelve rows shown. The plate 15 may be turned with the ends 19 and 20 reversed as it is applied to the control switch box 88 so that twelve different washing programs are provided for. Preferably the top face of plate 15 is provided with indicia as shown by FIG. 12 to indicate the selected program. However, if desired, the upper face of plate 15 may be provided with similar rows of humps and depressions to provide for additional washing programs.

The plate 15 is adapted to be applied to the control switch box for an automatic washer, the top surface of which is indicated by the reference numeral 88.

The plate 15 is held against the switch box 88 by fixed and movable hooks 21 and 22 respectively which engage in notches 23 in the opposite edges of plate 15. As indicated by FIG. 12 the particular set of notches in which the hooks are positioned determines the particular washing program which has been selected.

The switch box 88 is provided with a plurality of switch actuators 89 similar to the plungers 24 of FIG. 21 which actuate normally closed switches 90 which are either opened or closed depending upon whether the upper end of the actuator is opposite an elevation 16 or a depression 87.

The operation is substantially the same as that described in connection with FIG. 21. When it is desired to change to a different program it is only necessary to release the movable hook 22, move the plate 15 so that the hook 21 engages a different notch 23 and re-engage the movable hook 22.

FIGS. 15 and 16 show an arrangement by which a selector plate similar to the plate 15, with the notches 23 and hooks 21 and 22 omitted, may be moved from one program setting to another.

The selector plate is slidably mounted in a housing having a window 26 through which the indicia on the top face of the plate is visible. The selector plate is provided with a rack 29 which engages a pinion 28 whereby rotation of the pinion will move the selector plate back and forth to change the program setting. A handwheel 27 is positioned on the outside of the housing and is connected to the pinion 28 by means of a shaft whereby rotation of the handwheel 27 will rotate the pinion 28 and thus move the selector plate back and forth in the housing until the desired program setting is visible through the window 26.

FIG. 17 shows an arrangement in which the various operations of a selected program are visible through a window 30 in a housing in which a program selector is positioned. A pointer 31 is connected by means of an endless belt to the program timer. As the program proceeds the pointer is moved along the window 30 to indicate the particular washer operation then in progress.

The program selector of FIG. 18 is in the form of a flexible band 32 encircling a roller 34 adapted to be rotated by a knob 35. As shown the roller 34 is provided with indentations which mesh with protuberances on the inside of the band 32.

In FIG. 19 the arrangement is similar and where the parts are the same they have been given the same reference numerals. In FIG. 19 the flexible band is in the form of a hanging loop 32' having interior protuberances which mesh with the indentations on the exterior of the roller 34 so that as the roller is rotated the band 32' is moved from one setting to another.

FIG. 20 is a development of the exterior surface of band 32' of FIG. 19. As shown, it is provided along its width with projections 33. Similar projections 33' are provided on the band 32 of FIG. 18.

The projections actuate switches 91 which control the various operations of a program control device similar to that described in connection with FIG. 21.

While only a single switch 91 is shown, it is to be understood that in actual practice a plurality of such switches are spaced along the width of the bands.

By rotating the knob 35 to bring the various rows of protuberances 33 or 33' into different positions a plurality of washing programs may be set up. Additional washing programs may be provided for by replacing the bands 32 or 32' with bands having a different arrangement of protuberances.

In both FIGS. 18 and 19 the mechanisms above described are housed within a housing having a window 36, through which indicia 37, shown in FIG. 20, is visible to indicate the program for which the selector is set.

In each of the modifications disclosed herein the program selector is stationary during program operations with the result that there is little wear on the selector. Additionally, close tolerances are not necessary, with the result that the selectors are inexpensive to manufacture.

In each of the modifications herein the indicia "Progr A" etc. may be replaced with indicia indicating the particular type of wash for which the program selector is set.

For example, the indicia "delicate," "coloreds," "whites," "boiling washing," etc. could be substituted.

While I have shown a number of variations of my invention it is to be understood that those variations are to be taken as illustrative only and not in a limiting sense. I do not wish to be limited to the particular structure shown and described but wish to include all equivalent variations thereof except as limited by the scope of the claims.

I claim:

1. In combination, a timer for a washing machine, a plurality of component energizing switches sequentially actuated by said timer and operative to carry out selected washing programs, a plurality of program selector switches, said timer being capable of executing different washing programs depending upon the actuation of different selected combinations of said program selector swicthes, an elongated open ended receptacle, an actuator for each of said program selector switches spaced along the length of said receptacle and an elongated key for actuating selected combinations of said actuators to preselect different programs, said key being readily inserted into and removed from the open end of said receptacle and being movable to at least two different stationary operative positions after insertion into said receptacle, means spaced along the length of said key for actuating said actautors, the spacing being such that in one operative position of said key a selected combination of said program selector switches are actuated to set up one selected washing program and when said key is in a second operative position another selected combination of said program selector switches are actuated to set up a different selected washing program.

2. In a washing machine according to claim 1 in which said receptacle and key are so formed that as said key is inserted longitudinally into said receptacle it will be in an inoperative position and requires further movement within said receptacle to bring it into operative position.

3. In a washing machine according to claim 1 in which said key and receptacle are so formed that said key may be longitudinally withdrawn from one operative position, rotated and longitudinally reinserted into said receptacle in another of its operative positions.

4. In a washing machine according to claim 1 in which said key includes a stem and said switch actuating means is formed on both faces of said stem.

5. In a washing machine according to claim 1 in which said key is formed as a strip with said switch actuating means spaced longitudinally along both edges of said strip.

6. In a washing machine according to claim 1 in which said key and receptacle are constructed to form at least four angularly spaced operative positions for said key.

7. In a washing machine according to claim 6 in which said key is cruciform in section and said switch operating means is spaced longitudinally along each of its edges.

8. In a washing machine according to claim 1 in which said key and receptacle are so formed that said key may be inserted into said receptacle with either end foremost to set up different programs depending upon which end of said key is foremost as it is inserted into said receptacle.

References Cited in the file of this patent

UNITED STATES PATENTS

| | | |
|---|---|---|
| 1,822,000 | Young | Sept. 8, 1931 |
| 2,055,031 | Hutchings | Sept. 22, 1936 |
| 2,057,532 | MacDonald | Oct. 13, 1936 |
| 2,078,637 | Naden | Apr. 27, 1937 |
| 2,089,618 | Plym et al. | Aug. 10, 1937 |
| 2,734,954 | Kidd | Feb. 14, 1956 |
| 2,856,474 | Norris | Oct. 14, 1958 |
| 2,876,305 | Leber | Mar. 3, 1959 |
| 2,885,664 | McCue | May 5, 1959 |
| 2,991,343 | Norden | July 4, 1961 |
| 2,994,749 | Gartner | Aug. 1, 1961 |

FOREIGN PATENTS

| | | |
|---|---|---|
| 207,469 | Great Britain | Nov. 29, 1923 |
| 922,957 | Germany | Jan. 31, 1955 |

UNITED STATES PATENT OFFICE
CERTIFICATE OF CORRECTION

Patent No. 3,112,379                          November 26, 1963

Walter Holzer

It is hereby certified that error appears in the above numbered patent requiring correction and that the said Letters Patent should read as corrected below.

Column 5, line 26, for "12" read -- 21 --; column 6, line 61, for "to", first occurrence, read -- of --; column 9, line 18, for "swicthes" read -- switches --.

Signed and sealed this 26th day of May 1964.

(SEAL)
Attest:

ERNEST W. SWIDER                          EDWARD J. BRENNER
Attesting Officer                            Commissioner of Patents